United States Patent Office 2,774,782
Patented Dec. 18, 1956

2,774,782

α-HYDROXYPHENYL-β-ALKANOYLPHENYL AND β-GLYCOLYLPHENYL ACRYLONITRILES AND DERIVATIVES THEREOF

Kurt J. Rorig, Evanston, Ill., assignor, by mesne assignments, to G. D. Searle & Co., Skokie, Ill., a corporation of Delaware No Drawing. Application June 7, 1954,
Serial No. 435,072

9 Claims. (Cl. 260—465)

The present invention relates to a new group of acrylonitriles and, more specifically, to α-hydroxyphenyl-β-alkanoylphenylacrylonitriles, α-hydroxyphenyl-β-glycolylphenylacrylonitriles, and esters thereof. The compounds which constitute my invention can be represented by the general structural formula

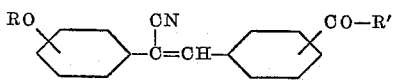

wherein R is a member of the class consisting of hydrogen and lower alkylcarbonyl radicals and R' is a member of the class consisting of lower alkyl, hydroxymethyl and lower alkylcarbonyloxymethyl radicals.

In the foregoing structural formula the radical R can represent hydrogen or a lower alkylcarbonyl radical wherein the lower alkyl moiety is a methyl, ethyl, straight- or branched-chained propyl, butyl, amyl or hexyl group, or a lower cycloalkyl group such as cyclopentyl and cyclohexyl. The radical R' can be a hydroxymethyl radical, a lower alkyl radical, or a lower alkylcarbonyloxymethyl radical wherein the lower alkyl group is defined as hereinabove.

The compounds which constitute my invention can be prepared conveniently from the α-hydroxyphenyl-β-carboxyphenylacrylonitriles which are the subject matter of my copending application, Serial No. 397,056, filed December 8, 1953. These acids are converted to the claimed compositions by the methods indicated in my copending application Serial No. 370,635, filed July 27, 1953, to be issued on June 15, 1954 as U. S. Patent No. 2,681,359. As indicated therein α-hydroxyphenyl-β-carboxyphenylacrylonitriles are acylated to form the α-acyloxyphenyl derivatives which, on treatment with thionyl chloride yield the α-(acyloxyphenyl)-β-(chloroformylphenyl)acrylonitriles of the structural formula

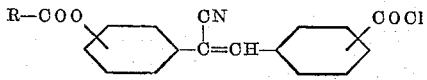

wherein R is a lower alkyl radical. Treatment of this compound with diazomethane yields a diazoacetyl derivative of the structural formula

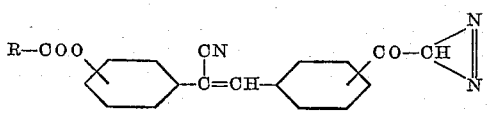

On heating under anhydrous conditions with a lower alkanoic acid of the formula

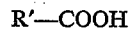

one obtains directly the esterified glycolylphenyl derivative of the structural formula

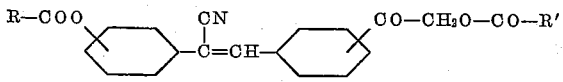

However, heating with an aqueous acid such as aqueous acetic acid, or preferably dilute sulfuric acid, yields the α-(hydroxyphenyl)-β-(glycolylphenyl)acrylonitrile of the structural formula

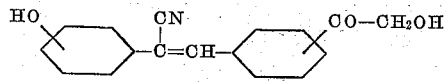

which can then be acylated in an additional step.

In my U. S. Patent No. 2,681,359, mentioned above, I have also indicated the conversion of the foregoing chloroformyl compounds with a lower alkyl metal compound such as dialkyl cadmium to yield an α-alkanoyloxyphenyl-β-alkanoylphenylacrylonitrile. An alternative reaction utilizes the condensation of these chloroformyl compounds with a magnesium derivative of the structural formula

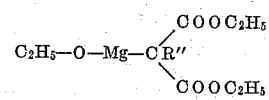

R" being hydrogen or lower alkyl to yield a malonoyl derivative of the type

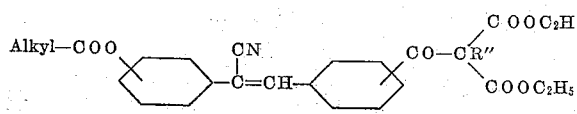

which can then be hydrolyzed and decarboxylated to the corresponding alkanoylphenyl derivative. As in the case of the glycolylphenyl derivatives, the α-alkylcarbonyloxyphenyl group is hydrolyzed to an α-hydroxyphenyl group if this decarboxylation reaction is conducted under conditions favoring hydrolysis.

The compounds of my invention possess adrenocorticoid properties of the cortisone type. They antagonize the hypertensive effect of desoxycorticosterone acetate. Besides offering valuable hormonal and cardiovascular effects, these compounds are also valuable in inhibiting inflammatory reactions, such as iritis.

The following examples illustrate in detail certain of the compounds which comprise this invention and methods for producing same. However, this invention is not to be construed as limited in spirit or in scope thereby. It will be apparent to those skilled in the art that many modifications in materials and methods may be made without departing from the invention. In these examples relative amounts of materials are given in parts by weight.

*Example 1*

Upon addition of a solution of 54 parts of sodium methoxide in 430 parts of methanol to a solution of 131 parts of p-cyanobenzaldehyde and 147 parts of p-methoxytolunitrile in 400 parts of methanol, an almost instantaneous precipitation of a yellow product begins. This product turns brown on standing in the alkaline solution but becomes yellow once more on coming in contact with air. The precipitate is collected on a filter and washed with methanol to yield a yellow solid. After successive recrystallizations from ethanol and acetone the α-(p-anisyl)-β-(p-cyanophenyl)acrylonitrile is obtained in very slender, lemon-colored needles melting at about 174–175° C.

A suspension of 56.5 parts of α-(p-anisyl)-β-(p-cyanophenyl)acrylonitrile in 2000 parts of methanol is heated at reflux and treated with a gaseous stream of hydrogen chloride for 3½ hours. 100 parts of water are added and refluxing is continued for 15 minutes. The hot reaction liquors are filtered and the precipitate is collected and recrystallized from a minimal amount of methanol. The methyl ester of α-(p-anisyl)-β-(p-carboxyphenyl)-acrylonitrile thus obtained melts at about 129–130° C.

A mixture of 10 parts of the methyl ester of α-(p-anisyl)-β-(p-carboxyphenyl)acrylonitrile is refluxed with 40 parts of freshly distilled pyridine hydrochloride for 45 minutes and then poured onto 750 parts of ice water. The flocculent, yellow precipitate is collected on a filter, washed with water, dried and recrystallized from hot dioxane. The α-(p-hydroxyphenyl)-β-(p-carboxyphenyl)acrylonitrile is thus obtained in yellow needles which melt at about 293–295° C.

Example 2

A mixture of 20 parts of α-(p-hydroxyphenyl)-β-(p-carboxyphenyl)acrylonitrile, 150 parts of pyridine and 110 parts of acetic anhydride is heated on a steam bath for 4 hours and cooled. A small quantity of precipitate is removed by filtration, and the filtrate is slowly treated with water, the temperature being maintained between 45–50° C. After decomposition of the unreacted anhydride has been completed, a gelatinous precipitate is removed by filtration. 250 additional parts of water are added at 50° C. The solution is then chilled and the precipitate is collected on a filter and washed with 50% ethanol. The α-(p-acetoxyphenyl)-β-(p-carboxyphenyl)acrylonitrile thus obtained melts at about 231–232° C. with previous sintering. The gelatinous by-product mentioned above sinters at about 215° C. and melts at about 305° C.

Example 3

A mixture of 5 parts of α-(p-acetoxyphenyl)-β-(p-carboxyphenyl)acrylonitrile, 110 parts of anhydrous thiophene-free benzene, 41 parts of thionyl chloride, and 0.1 part of pyridine is refluxed for 2 hours and then freed from volatile material by vacuum distillation on the steam bath. The yellow residue is dried on a clay plate. The α-(p-acetoxyphenyl)-β-(p-chloroformylphenyl)acrylonitrile thus obtained melts at about 175–177° C. with previous sintering.

Example 4

In the course of 10 minutes a solution of 6.15 parts of α-(p-acetoxyphenyl)-β-(p-chloroformylphenyl)acrylonitrile in 350 parts of warm thiophene-free benzene is added to a solution of 5.6 parts of diazomethane in 300 parts of ether maintained at about 2–8° C. The resulting suspension is maintained at room temperature for 20 hours, after which the yellow solid is collected on a filter. There is thus obtained α-(p-acetoxyphenyl)-β-(p-diazoacetylphenyl)acrylonitrile which melts at about 169–171° C. with decomposition.

Example 5

An anhydrous solution of 4 parts of α-(p-acetoxyphenyl)-β-(p-diazoacetylphenyl)acrylonitrile in 32 parts of glacial acetic acid is refluxed for 25 minutes with 0.5 part of fused sodium acetate and then cooled to yield a lustrous yellow-orange solid consisting of α-(p-acetoxyphenyl)-β-[p-(β-acetoxyacetyl)phenyl]acrylonitrile. Operating under somewhat less anhydrous conditions, one obtains also the deacetylated product. Pure α-(p-acetoxyphenyl)-β-[p-(β-acetoxyacetyl)phenyl]acrylonitrile is obtained from such a mixture by the following procedure. 3.85 parts of the mixture or of α-(p-hydroxyphenyl)-β-(p-glycolylphenyl)acrylonitrile, 30 parts of pyridine and 18 parts of acetic anhydride are heated on a steam bath for 2 hours. The excess acetic anhydride is then decomposed by addition of water at about 45–50° C. After addition of a total of about 30 parts of water the mixture is cooled and the precipitate is collected on a filter. Further yield is obtained from the mother liquor by concentration and dilution with water. The α-(p-acetoxyphenyl)-β-[p-(β-acetoxyacetyl)phenyl]acrylonitrile is thus obtained in golden needles melting at about 179–180° C. The infrared absorption spectrum shows maxima at 4.52, 5.70, 5.79, 5.88, 6.30, 6.66, 707, 7.33, 8.1, 9.18, 10.3, 10.97, 11.73, and 12.09 microns. The compound has the structural formula

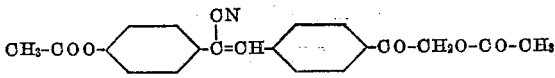

Example 6

A mixture of 4 parts of α-(p-acetoxyphenyl)-β-(p-diazoacetylphenyl)acrylonitrile and 100 parts of dioxane is heated on the steam bath. 20 parts of 5% sulfuric acid are added dropwise and when nitrogen evolution subsides the mixture is refluxed for 30 minutes. On cooling and dilution with water, an orange-brown precipitate is obtained which is collected on a filter. The α-(p-hydroxyphenyl)-β-(p-glycolylphenyl)-acrylonitrile thus obtained melts at about 270–280° C. with previous sintering. Infrared absorption maxima are observed at 2.9, 3.0, 4.52, 5.9, 6.3, 6.68, 7.07, 7.34, 8.04, 8.5, and 10.93 microns. The compound has the structural formula

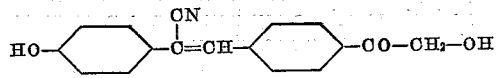

Example 7

A mixture of 262 parts of m-cyanobenzaldehyde and 266 parts of o-hydroxytolunitrile in 800 parts of methanol is stirred with a solution of 108 parts of sodium methoxide in 900 parts of methanol. After standing at room temperature for an hour, the reaction mixture is stirred and treated with a stream of gaseous hydrogen chloride. The precipitate is collected on a filter and freed from sodium chloride by washing with water. The α-(o-hydroxyphenyl)-β-(m-cyanophenyl)acrylonitrile forms fine lemon-colored rhomboid needles. The infrared absorption spectrum shows maxima at 2.82 and 4.50 microns.

A solution of 50 parts of this dinitrile in 1200 parts of 2-propanol and 500 parts of 10% aqueous sodium hydroxide is refluxed for 20 hours after which most of the 2-propanol is removed by vacuum distillation on the steam bath. The residue is diluted with 2500 parts of water and saturated with solid carbon dioxide to precipitate a small quantity of purely phenolic material. The latter is removed by extraction with ether and the remaining aqueous solution is carefully acidified with hydrochloric acid. A yellow precipitate of α-(o-hydroxyphenyl)-β-(m-carboxyphenyl)acrylonitrile forms which is collected on a filter and recrystallized from a dioxane-water mixture. An 0.5% sample in a potassium bromide disc shows infrared absorption at 2,93, 4.49, 5.89, 6.26, 6.60, 8.05, 8.50, and 12 microns.

A mixture of 10 parts of this product, 75 parts of pyridine and 78 parts of butyric anhydride are heated on a steam bath for 6 hours, filtered and treated with water at about 50° C. until the exothermic effect is no longer observed. After further dilution with water to the point of incipient crystallization, the mixture is cooled and the α-(o-butyroxyphenyl)-β-(m-carboxyphenyl)acrylonitrile is collected on a filter. 5.5 parts of this acid, 1200 parts of thiophene-free benzene, 40 parts of thionyl chloride, and 0.5 part of pyridine are refluxed for 3 hours and then freed from excess thionyl chloride, benzene and pyridine by vacuum distillation. 5 parts of the yellow powdery residue, dissolved in 400 parts of thiophene-free benzene, are added gradually to 4.2 parts of diazomethane in 300 parts of ether while the temperature is maintained at 0–5° C. A copious precipitate is obtained. The suspension is permitted to stand at room temperature for a day. The yellow solid precipitate of α-(o-butyroxyphenyl)-β-(m-diazoacetylphenyl)acrylonitrile is collected on a filter.

Under anhydrous conditions 3 parts of this product and 90 parts of propionic acid are refluxed for an hour. 0.5 part of sodium propionate is added as well as some boiling chips to facilitate nitrogen dispersal. Refluxing is continued for 30 minutes after which the reaction mixture is cooled to yield α-(o-butyroxyphenyl)-β-(m-propionoxyphenyl)acrylonitrile. Operating under anhydrous conditions, only minor admixtures of α-(o-hydroxyphenyl)-β-(m-glycolylphenyl)acrylonitrile are obtained. The principal reaction product shows infrared maxima at 4.51, 5.70, 5.78, 5.88, and 6.3 microns. It has the structural formula

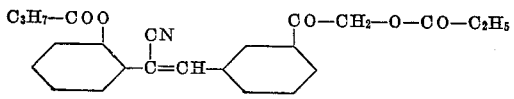

Refluxing of this product with 15% aqueous hydrochloric acid yields α-(o-hydroxyphenyl)-β-(m-glycolylphenyl)acrylonitrile in yellowish-brown, high-melting needles. The infrared absorption spectrum shows maxima at 2.92, 3.0, 4.51, 5.91, 6.27, 6.68, and 7.98 microns. The compound has the structural formula

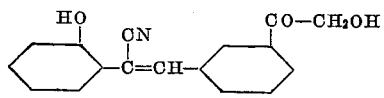

Example 8

Under a nitrogen atmosphere a mixture of 5 parts of magnesium, 8 parts of absolute ethanol, 1.6 parts of carbon tetrachloride and 35 parts of absolute ether is stirred and refluxed with a solution of 35 parts of diethyl malonate in 55 parts of absolute ether. Refluxing is continued until all of the magnesium has reacted. Then 500 parts of absolute ether and a solution of 42 parts of α - (p - acetoxyphenyl)-β-(p-chloroformylphenyl)acrylonitrile in 1000 parts of hot benzene are added. Refluxing and vigorous stirring are continued for 75 minutes. After cooling, the yellow heterogeneous reaction mixture is added to 1100 parts of dilute aqueous sulfuric acid. A large insoluble yellow plastic lump is formed. The organic layer is separated and the aqueous layer is extracted with ether. The combined organic solutions are washed with sodium bicarbonate solution and with water and then concentrated under vacuum to an oil. The oil is taken up in 170 parts of glacial acetic acid and added to the large plastic lump. 9 parts of concentrated sulfuric acid and 8 parts of water are added and the reaction mixture is heated to reflux with vigorous stirring for 3 hours. The heterogeneous mixture is diluted with 2000 parts of water and the canary-yellow product is collected on a filter. In a melting point tube the product sinters at about 200-210° C., fuses to the wall at about 240-245° C. and becomes transparent at about 265-270° C. without evolution of gas. Recrystallized from dioxane and then from glacial acetic acid, α-(p-hydroxyphenyl)-β-(p-acetophenyl)acrylonitrile is obtained in crystals which melt at about 272-282° C. after sintering at about 240-245° C. The compound is soluble in hot ethanol, hot dimethylformamide, hot ethoxyethanol and hot dioxane. It has the structural formula

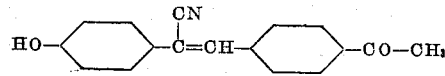

Example 9

A mixture of 10 parts of α-(p-hydroxyphenyl)-β-(p-acetophenyl)acrylonitrile, 70 parts of pyridine, and 53 parts of acetic anhydride is heated for 2 hours on a steam bath and then treated slowly with water at 50° C. to decompose the excess acetic anhydride. 25 additional parts of water are added, after which the mixture is cooled and the light yellow precipitate is collected on a filter. On sublimation at about 190-200° C. and 0.1 mm. pressure, the α-(p-acetoxyphenyl)-β-(p-acetophenyl)acrylonitrile melts at about 202-208° C. The product is not very soluble in hot benzene, ethanol, ethyl acetate, but very soluble in dioxane. It has the structural formula

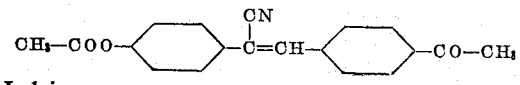

I claim:
1. A compound of the structural formula

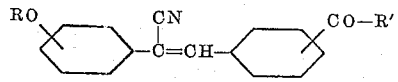

wherein R is a member of the class consisting of hydrogen and lower alkylcarbonyl radicals and R' is a member of the class consisting of lower alkyl, hydroxymethyl and lower alkylcarbonyloxymethyl radicals.

2. An α-(hydroxyphenyl)-β-(glycolylphenyl)acrylonitrile.

3. α - (p - Hydroxyphenyl)-β-(p-glycolylpenyl)acrylonitrile.

4. A compound of the structural formula

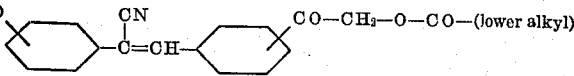

5. α - (p - Acetoxyphenyl) - β - [p-(β-acetoxyacetyl)-phenyl]acrylonitrile.

6. An α - (hydroxyphenyl) - β - (lower alkylcarbonylphenyl)acrylonitrile.

7. α - (p - Hydroxyphenyl)-β-(p-acetophenyl)acrylonitrile.

8. A compound of the structural formula

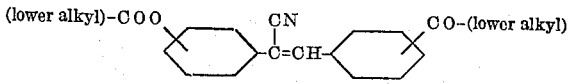

9. α - (p - Acetoxyphenyl)-β-(p-acetophenyl)acrylonitrile.

References Cited in the file of this patent
UNITED STATES PATENTS
2,691,044    Kolling et al. _____ Oct. 5, 1954